Aug. 11, 1970   A. G. RAWCLIFFE   3,523,662
FLUID CONTROL MEANS FOR AN AIRCRAFT
Filed June 11, 1968   2 Sheets-Sheet 1

United States Patent Office 3,523,662
Patented Aug. 11, 1970

3,523,662
FLUID CONTROL MEANS FOR AN AIRCRAFT
Antony G. Rawcliffe, Stevenage, England, assignor to British Aircraft Corporation Limited, London, England, a British company
Filed June 11, 1968, Ser. No. 736,135
Claims priority, application Great Britain, June 26, 1967
29,452/67
Int. Cl. B64c 15/14
U.S. Cl. 244—52                                4 Claims

ABSTRACT OF THE DISCLOSURE

A fluid control system for a missile where ram air is mixed with the gaseous combination product in a jet pump. The resultant flow is remotely controlled by a fluidic switch which is capable of directing the flow at an inclination to the fin from which it exits. This flow can produce a jet flap that can exert an aerodynamic lift on the fin.

---

Figure 1:
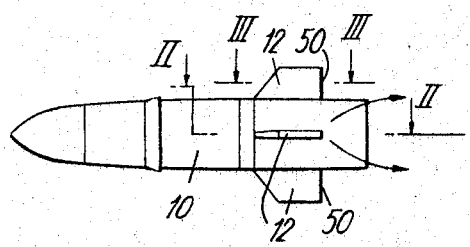

This invention concerns air vehicles of the type having a body, a jet propulsion unit and a fin or fins projecting from the body and acting to stabilise the vehicle during flight, and is concerned particularly with apparatus by means of which the orientation of the vehicle can be controlled from a remote source to steer the vehicle.

In the specification, the term "fin" is used to denote an aerofoil section member which is intended in flight to act primarily to stabilise and steady the flight, and to have a mean incidence which is zero. The term is used to distinguish from a "wing" which is intended in flight to have a finite angle of incidence to the streamlines, and to have circulation around it, and in consequence to be subjected to aerodynamic lift.

Missiles are of the type of air vehicles specified, and until now, the jet deflection apparatus described in our British Pat. No. 1,097,038 has probably been the most powerful means available for steering them. It acts, fundamentally, by slightly moving transversely the axis of the main jet propulsion thrust. Although that apparatus has been developed to a high degree of reliability, the valves, actuators and nozzle gimbals which are used therein make up a sophisticated assembly which requires precise manufacture. The cost of the charge case, the relief valve, the igniter, and the valve electronics, amounts to about ⅓ of the total missile cost. The high temperature and dirt content of the hot gas used in the apparatus severely limit its possible running time, and any small departure from correct manufacture or assembly can cause premature failure of the missile. As this system has moving mechanical parts it has a time lag which is greater than what can be obtained from a fluidic system, and which is obviously detrimental to stability.

If one controls the orientation of the missile by ejecting gas transversely from it, certain problems rise. For example, the gas has to be stored within the missile, and is ejected transversely so that it rotates the missile according to the principle of the conservation of momentum. But even in cases requiring only minute control forces, the gas consumption is so great as to make such a system impracticable. This is true even when using a potent gas source such as "Cordite."

It has been found in experiments that in order to obtain a maneuverability with a transverse ejection system which is comparable to that available in the system described in our Pat. No. 1,097,038 the required propellent consumption rate is similar to that of the main propulsion system. Side forces of up to about 30% of the axial thrust might be necessary to control the missile.

Although it would be preferable for maneuvering purposes to use gas which is bled from the main propulsion motor, there is the difficulty that if such gas is to be clean, it has to be bled from a part of the motor where it is at a very high temperature. Gas from a low temperature part of the motor has a high carbon content.

According to this invention an air vehicle has a jet-propulsion unit, a body, and a fin projecting from the body, the fin having a slot along its trailing portion and a means for supplying fluid to the slot during flight for the fluid to be discharged as a jet flap therefrom, the discharge being directed rearwards and inclined to the fin so that in flight the jet flap causes circulation around the combined fin and the jet flap.

This invention provides a means whereby the fin or fins on the vehicle can be caused to operate as wings, which is to say that the airflow past them exhibits circulation (sometimes termed "super circulation") around them, and in consequence aerodynamic lift is exerted on the fins. The lift can in preferred arrangements be varied in direction and in magnitude.

Figure 2:
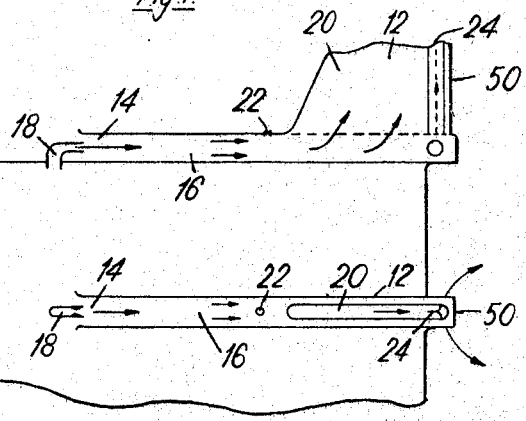
Figure 3:
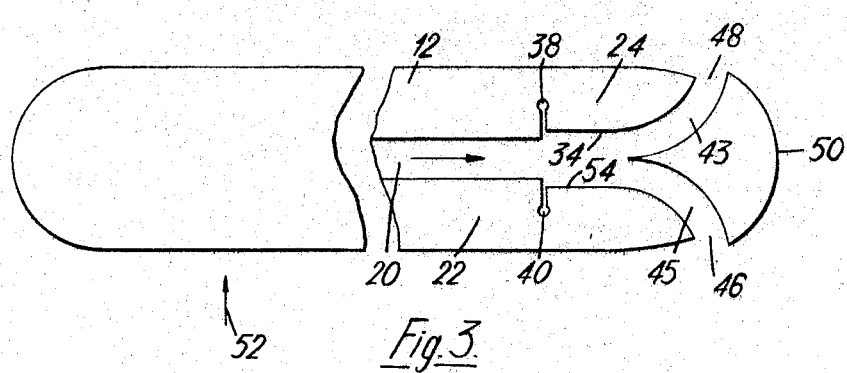
Figure 4:
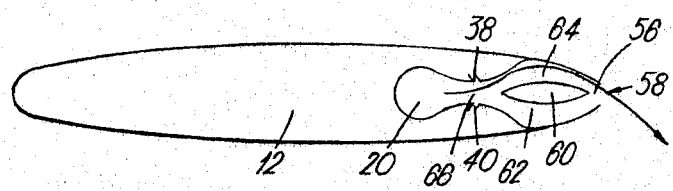

Two arrangements constructed in accordance with this invention are described below with reference to the accompanying drawings in which:

FIG. 1 is a side elevation of a missile;
FIG. 2 is a section on the line II—II in FIG. 1;
FIG. 3 is an enarged section of one fin, on the line III—III in FIG. 1;
FIG. 4 is a section similar to FIG. 3, but of an alternative arrangement; and
FIG. 5 is a diagram of a control fluid circuit.

The missile, as seen in FIG. 1, has a body 10 and four fins 12 equally spaced around the body so that they lie in two perpendicular pairs. They are identical, hence for ease the description of their construction will be related to one fin, but it is to be understood that all the fins are the same.

As seen in FIG. 2, the fin 12 has an associated jet pump 14, from which it receives fluid through a duct 16. The jet pump 14 receives ram air from the exterior of the missile, and mixes the ram air with gaseous combustion product from the propulsion motor through tappings 18. The fluids mix in the jet pump 14 and flow along the duct 16. A major part of the flow passes into a duct 20 which extends radially outwards along the length of the fin 12 and is referred to herein as the main flow. A small amount of the fluid is tapped through small ports 22 in the duct 16 and is directed to act as the control fluid of a fluidic switch 24.

Figure 5:
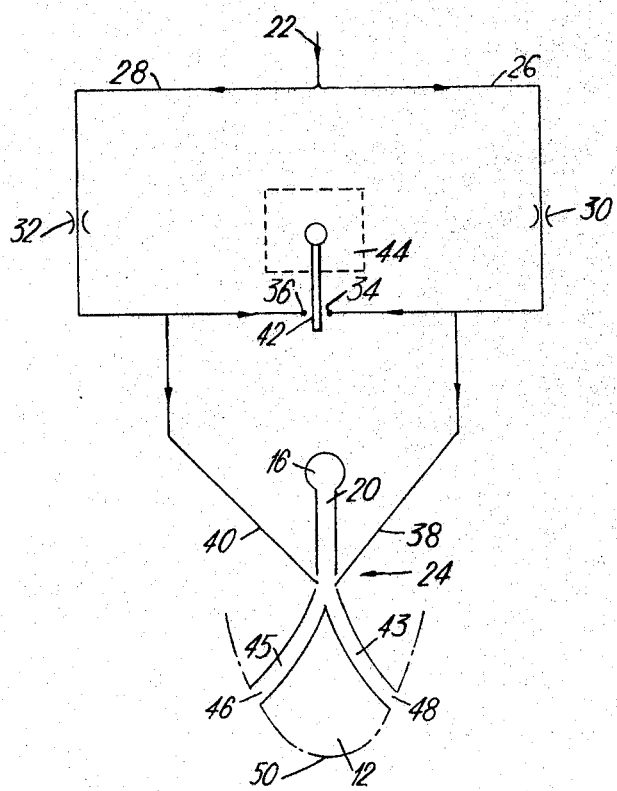

As seen best in the diagram which is FIG. 5, the control fluid from the tapping 22 divides to flow through two ducts 26 and 28 in parallel. These are restricted at 30 and 32 respectively, and each divides again to supply the fluid to respective exhaust nozzles 34 and 36, and respective inlets 38 and 40 to the fluidic switch 24. Mounted between the nozzles 34 and 36 is a flap 42 which is movable by a torque motor 44 which in turn is actuated by signals from the ground.

The main flow passes across the fluidic switch 24 from the duct 20 and leaves the switch by one of the slots 46 and 48 which lie on opposite sides of the trailing portion 50 of the fin 12.

Assuming for the purpose of description that the flow through the switch 24 is leaving initially at the outlet 43, and hence the slot 48, if a signal is emitted from a remote source on the ground which causes the torque motor to move the flap 42 to the right as seen in FIG. 4, so that it covers the nozzle 34 more than it does the nozzle 36, there is a build up of pressure in the line 38 which causes the flow issuing from the duct 20 to flow across the switch into the exit passage 45 and hence discharge from the slot 46. The flow leaving the slot 46 will constitute a jet flap, and the air flowing left to right past the fin as seen in FIGS. 1 and 2 will undergo circulation around the combined fin and jet flap in a clockwise direction, and this will give rise to an aerodynamic lift force on the fin in the direction of the arrow 52 seen in FIG. 3.

The flow of the fluid entering the switch at the control passage 38 is sufficient to deflect the flow from leaving at the slot 48, to leave instead at the slot 46. Once the flow at 38 has switched the main flow to leave at 46, the main flow will continue to flow out of the exit 46 even after the fluid from 38 has stopped because of Conanda effect causing the main flow to cling to the wall 54.

Conversely, if the signal from the ground moves the flap 42 to cover the nozzle 36, the pressure builds up in the duct 40 and the main flow is deflected to leave at the slot 48. This causes an anticlockwise circulation around the fin as seen in FIG. 3, and the lift force on the fin is in the direction opposite to that shown by the arrow 52. The outlets of the exit passages 43 and 45 are scoop shaped so that when, for example, the missile tilts upwards because of the jet flow from the slot 48, the slot 46 is exposed to the pressure of ram air, which counteracts any drop in static pressure in the duct 43, which would tend the flow to leave at the outlet 45.

When straight flight is required the flow both from the ram tappings and the propulsion motor can be stopped upstream of the jet pump, or alternatively the jet flap can be deflected rapidly between its two positions, spending a minimal but equal time at each position.

In the alternative arrangement seen in FIG. 4 there is only one slot 56 to the jet flap. It is located at the very trailing edge 58 of the fin. Mounted in the interior of the fin, upstream of the outlet 56, is a centre body 60 which defines two smoothly curved passages 62 and 64 which approach the slot 56 at different angles. A fluid switch 66 acts just upstream of the centre body 60. The main flow into the switch 66 passes across the switch from the duct 20, and leaves by passing around the centre body 60. The angle at which the flow is incident on the body 60 is controlled by the relative strengths of the flows from the passages 38 and 40, and these are dependent on the positions at which the flap 42 is held.

The jet flap which issues from the outlet 56 is the vector sum of the two flows leaving the passages 62 and 64.

The slot or slots need not be elongate uninterrupted apertures, but can be a series of closely spaced apertures, although this would be a less efficient arrangement.

It would be possible to combine the two position type of switch described with reference to FIG. 5, with the single slot fin seen in FIG. 4.

Preferably the fins are located as far aft of the missile as possible so that the aerodynamic lift acting on the fins has the maximum moment arm about the centre of gravity of the missile.

In the arrangements described above, the ram air flow is about seven times that of the combustion product of flow, giving a mixture temperature of about 250° C., and a pressure of about 4½ pounds per square inch above the ambient pressure. No special structural difficulties arise under these conditions.

The systems described continue to operate on ram air pressure alone after the propulsion motors have stopped.

I claim:

1. An air vehicle having a jet-propulsion unit, a body, a fin which projects from the body and has a slot along its trailing edge and two passages within the fin opening to the slot at different angles, the two passages being at their inner ends the exit passages of a fluidic switch, the vehicle further having a means for supplying fluid to the fluidic switch during flight for the fluid to be discharged as a jet flap from said slot, the discharge being directed rearwards and inclined to the fin so that in flight the jet flap causes circulation around the combined fin and jet flap.

2. A vehicle having a jet-propulsion unit, a body, a jet pump within the body, a fin which projects from the body and has a slot along its trailing edge, a means for supplying fluid to the slot during flight for the fluid to be discharged as a jet flap therefrom, the fluid being a combination of ram air, and gaseous combustion product from the propulsion unit which have been mixed in the jet pump, the discharge of the jet flap being directed rearwards and inclined to the fin so that in flight the jet flap causes circulation around the combined fin and jet flap.

3. An air vehicle having a jet-propulsion unit, a body, a jet pump within the body, a fin which projects from the body and has two slots on opposite sides of its trailing portion, the fin enclosing a fluidic switch which has an inlet, two control passages and two outlets, which outlets respectively lead to the two slots, the main flow through the switch passing from the inlet to at least one of the outlets, being deflectable by control flows from the control passages, the relative strength of the control flows being set by a flap, the opposite sides of which can at least partly cover two exhaust nozzles which branch from two parallel fluid circuits connecting a common source of the control fluid to the two control passages, the position of the flap between the two nozzles being set by a remotely controlled motor; the fluid of the control flow and the fluid of the main flow both being tapped from the jet pump which mixes gaseous combustion product of the propulsion motor and ram air, the fluid being discharged as a jet flap from one or the other of the slots whereby it is directed rearwards and inclined to the fin so that in flight the jet flap causes circulation around the combined fin and jet flap.

4. A missile which has a fast time response, and the trajectory of which can be remotely controlled in two planes, the missile having four flight-stabilizing fins disposed in perpendicular pairs, each fin enclosing a gas supply means, and a discharge direction control means which includes a remotely controllable fluidic switch, each fin further having at least one slot near its trailing edge, the gas supply means being operatively connected to the fluidic switch, which in turn operatively connects to the slot so that the gas discharges therefrom as a jet flap in a controlled direction which is rearwards and inclined to the plane of the fin.

References Cited

UNITED STATES PATENTS

| 2,974,904 | 3/1961 | Fielding et al. | 244—42 |
| 3,018,987 | 1/1962 | Multhopp | 244—42 |
| 3,150,625 | 9/1964 | Brooks | 244—52 |
| 3,229,460 | 1/1966 | Jones | 244—52 |
| 3,239,150 | 3/1966 | Chisel | 244—52 |
| 3,253,808 | 5/1966 | La Fave | 244—52 |

MILTON BUCHLER, Primary Examiner

J. E. PITTENGER, Assistant Examiner

U.S. Cl. X.R.

239—265.23